United States Patent [19]

Hale

[11] Patent Number: 5,440,865
[45] Date of Patent: Aug. 15, 1995

[54] CROP CUTTING ASSEMBLY

[76] Inventor: Elcie C. Hale, 890 Forgotten La., Winnsboro, La. 71295

[21] Appl. No.: 199,609

[22] Filed: Feb. 22, 1994

[51] Int. Cl.6 ............................................ A01D 41/06
[52] U.S. Cl. ........................................ 56/14.4; 56/122
[58] Field of Search .................. 56/14.4, 14.6, 122; 460/78

[56] References Cited

U.S. PATENT DOCUMENTS

| | | | |
|---|---|---|---|
| 2,112,922 | 4/1938 | Millard | 56/122 |
| 2,245,997 | 6/1941 | Olson | 56/122 X |
| 2,755,912 | 7/1956 | Ashton | 56/14.4 X |
| 3,881,301 | 5/1975 | Sawyer | 56/14.4 |
| 4,903,466 | 2/1990 | Sionneau | 56/14.6 |
| 5,005,343 | 4/1991 | Patterson | 56/14.4 |

Primary Examiner—George A. Suchfield
Attorney, Agent, or Firm—John M. Harrison

[57] ABSTRACT

A crop or produce cutting assembly for mounting in a combine header, which assembly is characterized by multiple cutter blades mounted by means of a pair of blade mount brackets on the platform of the combine header, such that the cutter blades are located in close proximity to the combine cross auger. The blades serve to cut vines associated with crop or produce such as soybeans which tend to wrap around the rotating cross auger and reduce efficient processing of the crop through the combine. In a preferred embodiment of the invention the cutter blades are characterized by triangular, double-serrated blades and the blade mount brackets are adjustable to facilitate location of the blades in a selected close proximity to the rotating cross auger. The blades are spaced from each other to facilitate access by auger fingers projecting from the cross auger, which fingers aid in movement of the crop or produce from the rotating cross auger through the combine.

16 Claims, 1 Drawing Sheet

CROP CUTTING ASSEMBLY

BACKGROUND OF THE INVENTION

1. Field of the Invention

This invention relates to combines and more particularly, to a produce or crop cutting assembly for mounting on the header platform of a combine to position multiple cutting blades in close proximity to the rotating combine cross auger. The multiple, spaced cutter blades are designed to cut vines and tangled vetch associated with crop or produce elements such as soybeans which would normally wrap around the rotating auger and prevent efficient processing of the produce through the combine. In a preferred embodiment blade mount brackets attached to the combine platform adjacent to the crop discharge window are adjustable to facilitate location of the spaced cutter blades in a selected close proximity with respect to the rotating auger, for more efficient cutting of vines, stalks and other tangling elements which tend to entangle and wrap around the auger, thus frequently necessitating combine shutdown and manual removal of the crop or produce.

2. Description of the Prior Art

One of the problems realized in operating combines to harvest such crops as soybeans, is that of entanglement of the vines and other associated crop elements around the rotating auger which operates to move the precut crop from the field through a produce discharge window and on through the combine, to remove the beans from the stalks. The crop is initially cut near the ground by a set of stalk cutting blades mounted on the front of the header. The vines tend to wrap around flights and auger fingers on the rotating cross auger, thereby choking the cross auger, blocking the crop discharge window and ultimately necessitating stopping the combine and manually removing the vines from the auger before proceeding with the harvest. The necessity for periodically stopping and removing vines, stalks and other produce or crop elements from entanglement with the cross auger is expensive, time-consuming and greatly increases crop harvesting time. The result is an expensive increase in the cost of both labor and wear and tear on equipment, as well as a greater chance for crop spoilage in the field.

It is therefore an object of this invention to provide a crop cutting assembly for mounting on a combine and cutting vines and other crop or produce elements which tend to wrap around and entangle the rotating cross auger in the combine header, thereby decreasing harvesting time, as well as the incidence of downtime and maintenance required on the combine.

Another object of this invention is to provide a new and improved crop cutting assembly fitted with multiple cutter blades and blade mount brackets mounted on the combine header, with the cutter blades located in close proximity to the rotating cross auger for cutting vines, stalks and other produce elements which entangle the cross auger, thereby promoting more efficient processing of the vines and produce elements to the combine.

A still further object of the invention is to provide a new and improved produce or crop cutting assembly for mounting on the combine header of a combine adjacent to the produce discharge window, which crop cutting assembly is fitted with multiple, spaced cutter blades located in close proximity to the rotating cross auger for cutting vines, stalks and other produce elements which tend to wrap around and jam the cross auger and damage the auger fingers as the combine harvests the crop.

SUMMARY OF THE INVENTION

These and other objects of the invention are provided in a new and improved crop cutting assembly for mounting on the combine header of a combine and extending multiple, spaced, double-tapered and serrated cutter blades in selected, adjustable, close proximity to the rotating cross auger to facilitate cutting vines, stalks, vetch and other produce or crop elements from the cross auger as the cross auger rotates, thereby preventing collection and entanglement of the vines and other crop elements on the cross auger and promoting more efficient processing of the crop through the combine.

BRIEF DESCRIPTION OF THE DRAWING

The invention will be better understood by reference to the accompanying drawing, wherein.

DESCRIPTION OF THE PREFERRED EMBODIMENTS

Figure 1:
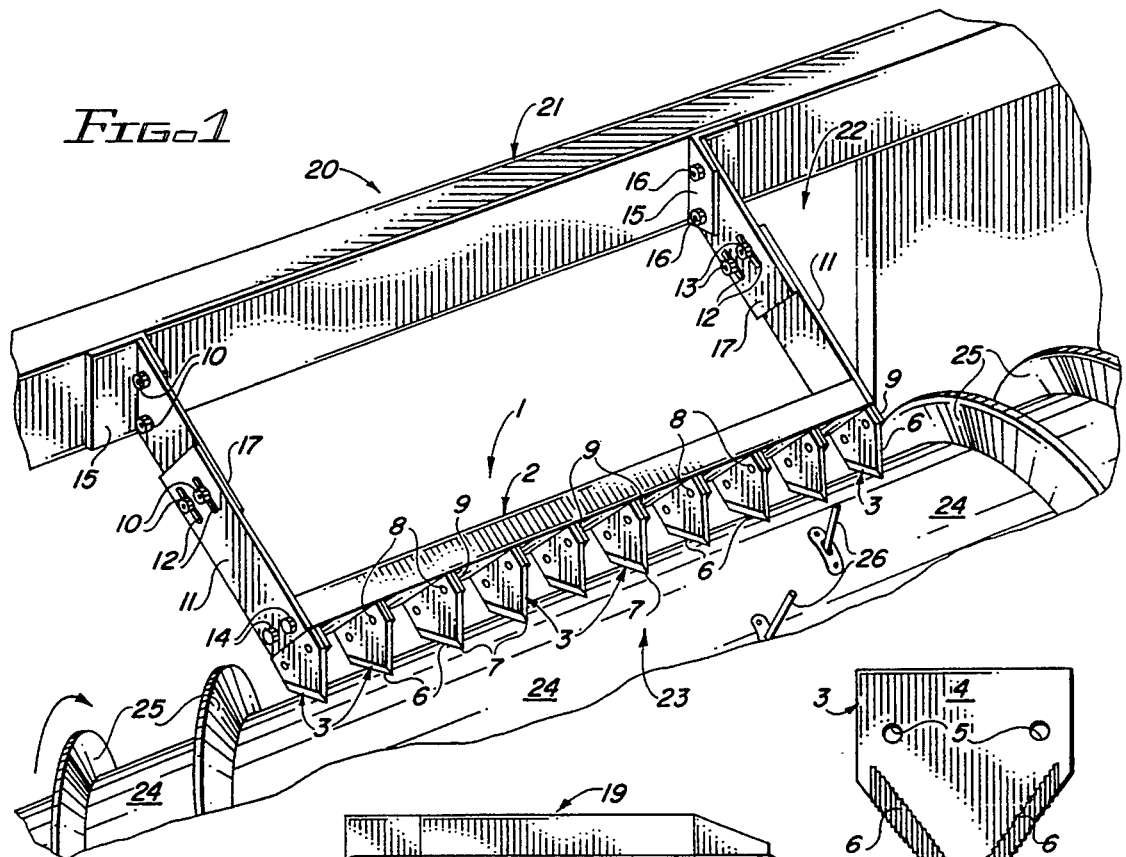
FIG. 1 is a perspective view of a preferred embodiment of the crop cutting assembly mounted on the combine header of a combine in functional position.
Figure 4:
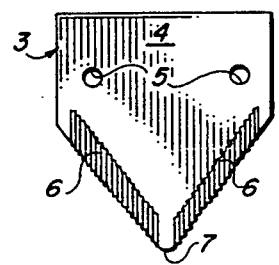
FIG. 4 is a front view of a preferred double-tapered and serrated cutter blade for use in the crop cutting assembly illustrated in FIGS. 1-3.
Figure 2:
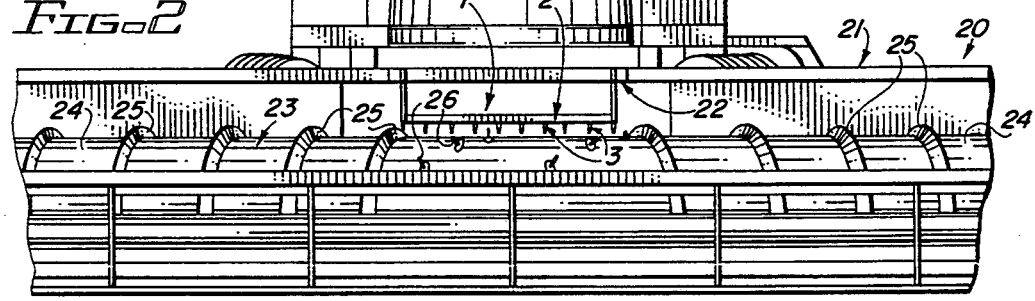
FIG. 2 is a top view of the crop cutting assembly illustrated in FIG. 1.
Figure 3:
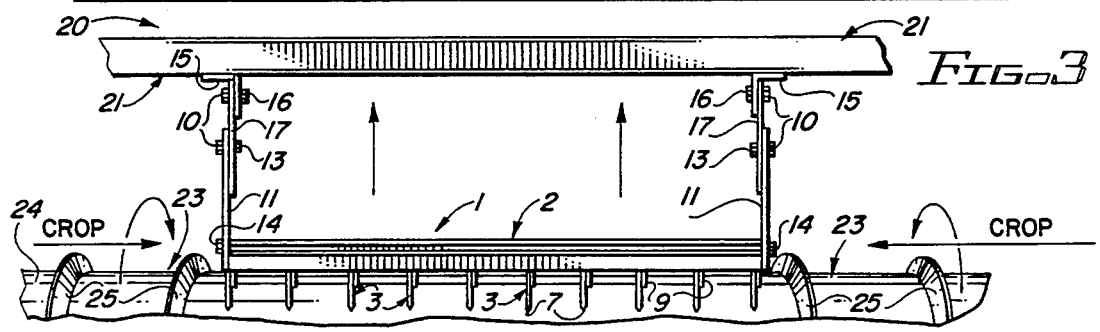
FIG. 3 is a front view of the crop cutting assembly illustrated in FIGS. 1 and 2.

Referring initially to FIGS. 1-3 of the drawing, in a preferred embodiment of the invention the crop cutting assembly of this invention is generally illustrated by reference numeral 1. The crop cutting assembly 1 is mounted on the platform 21 of a combine header 20, mounted on a combine 19 (illustrated in FIG. 1), in front of the crop discharge window 22 and extending toward the rotating cross auger 23. The produce cutting assembly 1 is characterized by an elongated blade bar 2, positioned parallel to and spaced from the cross auger 23 and fitted with multiple cutter blades 3, each having a blade base 4, bolted to a blade mount bracket 9 by means of blade mount bolts 8, extending through mount holes 5 provided in each blade base 4 and threaded into the corresponding blade mount bracket 9, as illustrated in FIG. 4. In a most preferred embodiment of the invention, each blade base 4 is characterized by a pair of converging, tapered serrations 6 which terminate in a sharp blade point 7. The respective blade points 7 of each of the spaced cutter blades 3 thus terminate in close proximity to the cylindrical auger barrel 24 of the cross auger 23 and the spacing of the cutter blades 3 with respect to each other facilitates passage of the rotating auger fingers 26, projecting from the auger barrel 24 as illustrated in FIGS. 1 and 2. One end of a pair of blade bar brackets 11 is bolted to each end of the blade bar 2 by means of blade bar bracket bolts 14 and the opposite end of each of the blade bar brackets 11 is fitted with longitudinal bracket slots 12, illustrated in FIG. 1, which accommodate adjusting bolts 13 and cooperating nuts 10, for adjustably securing the blade bar bracket 11 to a pair of platform mount plates 17, extending from attachment to a corresponding pair of platform brackets 15, which are welded or otherwise attached directly to the platform 21 of the combine header 20. Attachment of the platform mount plate 17 to the respective platform brackets 15 in fixed relationship is effected by means of platform bracket bolts 16 and corresponding nuts 10, as further illustrated in FIG. 1. Accordingly, it will be appreciated from a consideration of FIG. 1 of the drawing that the multiple, spaced cutter blades 3 can be adjusted in concert into a selected close proximity with respect to the auger barrel 24 of the cross auger 23, by initially loosening the adjusting bolts 13 and corresponding nuts 10, sliding the respective blade bar brackets 11, blade bar 2 and cutter blades 3 in concert toward the cross auger 23 or toward the platform 21, as desired, by use of the bracket slots 12 and subsequently retightening the nuts 10 on the adjusting bolts 13, to achieve the selected positioning of the cutter blades 3.

Referring again to FIGS. 1 and 4 of the drawings, the cutter blades 3 are each most preferably characterized by a pair of double-tapered serrations 6, which converge to a sharp blade point 7, to facilitate extended use of each of the cutter blades 3 without requiring sharpening of the cutter blades 3. Accordingly, as illustrated in FIG. 1, the cutter blades 3 can be assembled and removably mounted on the blade mount brackets 9 using the blade mount bolts 8 as illustrated, until the top serrations 6 become dull by contact with crop elements which become entangled in the auger fingers 26 and the flights 25 on the auger barrel 24 of the cross auger 23. When this dulling occurs, the cutter blades 3 can be removed from the blade mount brackets 9 and reversed, to present the bottom set of serrations 6 in the top location for additional use without the necessity of sharpening the cutter blades 3.

In operation, and referring to FIGS. 1-3 of the drawings, the crop cutting assembly 1 of this invention is designed to cut vines, stalks and tangled elements associated with crops such as soybeans and vetch which tend to wrap around the auger barrel 24, flights 25 and auger fingers 26 of the cross auger 23. As the crop is cut, the crop initially enters the combine header 20 and is contacted by the flights 25 and channeled to the center of the cross auger 23 by operation of the flights 25. The auger fingers 26 then engage the crop and move it through the crop discharge window 22 for further processing in the combine 19. Under ordinary circumstances where the produce cutting assembly 1 is not in place, vines associated with some crops such as soybeans and vetch tend to wrap around the auger barrel 24 and soon render the auger fingers 26 less efficient in moving the crop through the crop discharge window 22 for further processing by the combine 19. These vines tend to thrash the crops in the header before processing in the combine, thereby causing crop loss. However, under circumstances where the produce cutting assembly 1 is in place as illustrated in FIGS. 1-3, this vine entanglement is prevented, since the vines, tangled crops, stalks, and the like, which tend to wrap around the auger barrel 24, are cut by the multiple cutter blades 3 as the cross auger 23 rotates in the direction indicated by the arrow in FIG. 1. Accordingly, this action allows the auger fingers 26 to perform their intended function of engaging the segments of crop moving around the auger barrel 24 and channelled to the center of the auger barrel 24 by the flights 25, and discharging the crop segments through the crop discharge window 22 for further processing.

It will be appreciated by those skilled in the art that the crop cutting assembly 1 of this invention operates most effectively to cut tangled vine elements growing with crops such as soybeans, vetch and the like, including other crops having vines and stalks tangled therein, to facilitate a smooth transition of crop moving from the cross auger 23 through the crop discharge window 22 and on through the combine 19. This positioning of the crop cutting assembly 1 facilitates substantially uninterrupted harvesting of the crop without the necessity of periodically stopping the combine 19 and manually cutting and removing the entangled vines, stalks, and other tangled crop elements from the cross auger 23. Accordingly, the crop cutting assembly 1 facilitates a considerable savings in labor costs, as well as a reduction in crop spoilage, due to faster harvesting and reduced equipment damage resulting from the accumulation of stalks, vines and other crop elements on the auger barrel 24, which accumulation places stress on the auger fingers 26, sometimes bending or breaking the fingers. The processing of the cut crop elements is also rendered much easier with less stress on the cross auger 23, as it rotates and moves the crop elements through the crop discharge window 22 of the combine header 20. It will be further appreciated by those skilled in the art that the size and dimensions of the crop cutting assembly 1 may be altered for mounting on substantially any combine 19 which utilizes a cross auger 23 to process and move crop elements from the field through a crop discharge window 22. Because the blade bar brackets 11 are adjustably mounted on the respective platform mount plates 17 by means of the bracket slots 12 and adjusting bolts 13, the distance between the cutter blades 3 and the auger barrel 24 of the cross auger 23 is easily adjusted and the width of the blade bar 2 and number of cutter blades 3 can be chosen and selected to accommodate the design of substantially any cross auger 23 having a selected pattern of auger fingers 26. In a typical mounting, the crop cutting assembly 1 may be positioned and mounted on the combine header 20 of a John Deere 900 series, rigid platform header designed for coupling to a John Deere "MAXIMIZER" (trademark) combine.

Although the crop cutting assembly of this invention has been described with the particularity indicated above, it will be recognized and understood that various modifications may be made in the invention and the appended claims are intended to cover all such modifications which may fall within the spirit and scope of the invention.

Having described my invention with the particularity set forth above, what is claimed is:

1. A crop cutting assembly for a combine having a rotating cross auger for handling a crop, comprising blade mount means having mount bolt apertures carried by the combine; at least one double-bevelled serrated blade having blade bolt apertures; bolts extending through said mount bolt apertures and said blade bolt apertures, with said at least one double-bevelled serrated blade extending from said blade mount means in close proximity to said cross auger; and nuts threaded on said bolts, for removably securing said at least one double-bevelled serrated blade to said blade mount means.

2. The crop cutting assembly of claim 1 wherein said at least one double-bevelled serrated blade comprises a plurality of double-bevelled serrated blades removably mounted on said blade mount means in spaced relationship with respect to each other.

3. The crop cutting assembly of claim 1 wherein said blade mount means comprises a pair of fixed blade mounts carried by the combine in spaced relationship with respect to each other, a pair of adjustable blade mounts carried by said fixed blade mounts in slidably adjustable relationship, respectively, and a blade bar spanning said adjustable blade mounts in fixed relationship and wherein said at least one double-bevelled serrated blade is removably attached to said blade bar, whereby said at least one double-bevelled serrated blade is adjusted with respect to the cross auger by adjusting said adjustable blade mounts with respect to said fixed blade mounts, respectively.

4. The crop cutting assembly of claim 3 wherein said at least one double-bevelled serrated blade comprises a plurality of double-bevelled serrated blades removably mounted on said blade bar in spaced relationship with respect to each other.

5. The crop cutting assembly of claim 3 comprising blade bar bolt apertures provided in said blade bar and bolts extending through said blade bar bolt apertures for removably securing said at least one double-bevelled serrated blade to said blade bar.

6. The crop cutting assembly of claim 5 wherein said at least one double-bevelled serrated blade comprises a plurality of double-bevelled serrated blades removably bolted to said blade bar in spaced relationship with respect to each other.

7. A crop cutting assembly for mounting on the platform of a combine, which platform includes a rotating cross auger, said crop cutting assembly comprising blade mount bracket means mounted on the platform and projecting toward the cross auger; an elongated blade bar carried by said blade mount bracket means and disposed in substantially parallel relationship with respect to the rotating cross auger; and a plurality of blade means removably mounted on said blade bar in spaced, substantially parallel relationship with respect to each other, said blade means extending substantially perpendicular with respect to the longitudinal axis of the cross auger, in close proximity to the cross auger.

8. The crop cutting assembly of claim 7 wherein each of said blade means comprises a double-bevelled serrated blade and aligned bolt apertures provided in said double-bevelled serrated blade and said blade bar for bolting said double-bevelled serrated blade to said blade bar.

9. The crop cutting assembly of claim 7 wherein said blade mount bracket means comprises a pair of fixed blade mount brackets mounted on the platform in spaced, substantially parallel relationship with respect to each other and a pair of adjustable blade mounts carried by said fixed blade mounts in slidably adjustable relationship, respectively, and wherein said blade bar is mounted on said adjustable blade mounts, for adjusting the distance between said blade means and the cross auger.

10. The crop cutting assembly of claim 9 wherein each of said blade means comprises a double-bevelled serrated blade and aligned bolt apertures provided in said double-bevelled serrated blade and said blade bar for bolting said double-bevelled serrated blade to said blade bar.

11. A crop cutting assembly for mounting a combine platform having a crop discharge window and a rotatable cross auger and disposed for cutting crop elements entangled on the cross auger, said crop cutting assembly comprising a pair of blade mount brackets fixedly mounted on the platform in spaced, substantially parallel relationship with respect to each other; a pair of adjustable brackets slidably adjustably attached to said blade mount brackets, respectively; an elongated blade bar fixedly attached to said adjustable brackets and oriented in substantially parallel, closely spaced relationship with respect to the cross auger; and a plurality of blades removably mounted on said blade bar in spaced, substantially parallel relationship with respect to each other and in substantially perpendicular and closely spaced relationship with respect to the cross auger, whereby said blades cut the crop elements entangled on the cross auger responsive to rotation of the cross auger in the platform.

12. The crop cutting assembly of claim 11 wherein each of said blades comprises a double-bevelled serrated blade, aligned bolt apertures provided in said blade bar and said double-bevelled serrated blade, bolts extending through said bolt apertures and nuts threaded on said bolts, for bolting said double-bevelled serrated blades to said blade bar.

13. The crop cutting apparatus of claim 11 comprising blade brackets provided on said blade bar and wherein said blade apertures are provided in said blades and said brackets and said blades are bolted to said blade brackets, respectively.

14. The crop cutting apparatus of claim 13 wherein each of said blades comprises a double-bevelled serrated blade and bolts extending through said bolt apertures and nuts threaded on said bolts, for bolting said double-bevelled serrated blade to said blade brackets, respectively.

15. The crop cutting apparatus of claim 13 comprising slots provided in said adjustable brackets, bolt apertures provided in said blade mount brackets and aligned with said slots, bolts extending through said slots and said bolt apertures and nuts threaded on said bolts, respectively, for adjusting said adjustable brackets with respect to said blade mount brackets and moving said blade bar and said blades into a selected close proximity with respect to the cross auger.

16. The crop cutting apparatus of claim 15 wherein each of said blades comprises a double-bevelled serrated blade, and bolts extending through said bolt apertures and nuts threaded on said bolts for bolting said double-bevelled serrated blades to said blade brackets, respectively.

* * * * *